United States Patent
Hwang et al.

(10) Patent No.: US 8,189,684 B2
(45) Date of Patent: May 29, 2012

(54) VIDEO DATA COMMUNICATION METHOD AND APPARATUS FOR IMPROVING TRANSMISSION EFFICIENCY

(75) Inventors: Gyung Ho Hwang, Daejeon (KR); Young Tak Kim, Daegu (KR); Soo Yong Koo, Daegu (KR); Young Chul Jung, Daegu (KR); Byoung Kil Kim, Daegu (KR)

(73) Assignee: Samsung Electronics Co., Ltd., Maetan-dong, Teongteng-gu, Suwon-si, Gyeonggi-do (KR)

( * ) Notice: Subject to any disclaimer, the term of this patent is extended or adjusted under 35 U.S.C. 154(b) by 1378 days.

(21) Appl. No.: 11/820,881

(22) Filed: Jun. 20, 2007

(65) Prior Publication Data

US 2008/0002777 A1  Jan. 3, 2008

(30) Foreign Application Priority Data

Jun. 20, 2006  (KR) .................. 10-2006-0055153

(51) Int. Cl.
 *H04N 7/12* (2006.01)
(52) U.S. Cl. .................. 375/240.26; 370/229
(58) Field of Classification Search ............ 375/240.26, 375/240.27, 240.28, 240.29; 370/229
 See application file for complete search history.

(56) References Cited

U.S. PATENT DOCUMENTS

| | | | | |
|---|---|---|---|---|
| 5,181,243 A | * | 1/1993 | Saltwick et al. | ............. 380/253 |
| 2007/0019551 A1 | * | 1/2007 | Pozhenko et al. | ............. 370/235 |

FOREIGN PATENT DOCUMENTS

| | | |
|---|---|---|
| KR | 2003-80000 | 10/2003 |
| KR | 2005-66950 | 6/2005 |
| KR | 2005-67677 | 7/2005 |
| KR | 2006-39601 | 5/2006 |

OTHER PUBLICATIONS

Ksentini, Adlen, et al.; "Toward an Improvement of H.264 Video Transmission Over IEEE 802.11e Through a Cross-Layer Architecture;" IEEE Communications Magazine, vol. 44, No. 1; Jan. 1, 2006; XP001238792.

Ramos, Naomi, et al.; "Quality of Service Provisioning in 802.11e Networks: Challenges, Approaches, and Future Directions;" IEEE Network, IEEE Service Center, NY, vol. 19, No. 4; Jul. 1, 2005; XP011136603.

Koo, Soo-Yong, et al.; "Management of IEEE 802.11e Wireless LAN for Realtime QoS-Guaranteed Teleconference Service with Differentiated H.264 Video Transmission;" Autonomic Management of Mobile Multimedia Services Lecture Notes in Computer Science, Berlin; Oct. 15, 2006; XP019047351.

* cited by examiner

*Primary Examiner* — Gilberto Barron, Jr.
*Assistant Examiner* — Malcolm Cribbs
(74) *Attorney, Agent, or Firm* — Cha & Reiter, LLC (57) ABSTRACT

A video data communication method and apparatus for a data communication that enable improving video quality, at a recipient device, and transmission efficiency by transmitting video data using both contention free transmission mechanism and priority-based transmission mechanism are provided. A video data transmission method ion includes dividing video data into different types of slices; assigning different transport priorities to slice types in accordance with importance for recovering, at a recipient device, the video data; and transmitting the slices on the basis of the transport priorities.

28 Claims, 10 Drawing Sheets

VIDEO DATA COMMUNICATION METHOD AND APPARATUS FOR IMPROVING TRANSMISSION EFFICIENCY

CLAIMS OF PRIORITY

This application claims priority to an application entitled "VIDEO DATA COMMUNICATION METHOD AND APPARATUS FOR IMPROVING TRANSMISSION EFFICIENCY," filed in the Korean Intellectual Property Office on Jun. 20, 2006 and assigned Serial No. 2006-0055153, the contents of which are incorporated herein by reference.

BACKGROUND OF THE INVENTION

1. Field of the Invention

The present invention relates to a data communication system and, in particular, to a video data communication method and apparatus which improves video quality at a recipient device and transmission efficiency by transmitting video data using both contention free transmission mechanism and priority-based transmission mechanism.

2. Description of the Related Art

Over the past few years, wireless local area networks (WLANs) based on the IEEE 802.11 specifications broadly adopted for Internet access in home and business. Early versions of IEEE 802.11 standard did not support classification of user data and priority. In order to secure Quality of Service (QoS), IEEE 802.11e proposed in 2005 introduced enhanced media access control (MAC) characterized by a hybrid coordination function (HCF). Within the HCF there are two access mechanisms, the enhanced distributed channel access (EDCA) and HCF controlled channel access (HCCA).

The EDCA provides differentiated and distributed access to the wireless medium with 4 access categories (AC) such that the data streams are transmitted in accordance with their priorities, and the HCCA guarantees reserved bandwidth for packets. Accordingly, an access point (AP) of IEEE 802.11e network can support both the asynchronous transmission and synchronous transmission.

Recently, H.264 as a new video coding standard is expected to be adopted in many applications.

The H.264 is a video compression algorithm of which root lie in the ITU-T's H.26L project and called in another name of MPEG-4 Advanced Video Coding (AVC). The H.264 promises significantly higher compression than the earlier standards. This standard achieves higher compression efficiency up to a factor of two over the MPEG 2 and enhances video quality. The H.264 also can provide DVD quality level video below 1 Mbps transmission rate so as to satisfy the requirements of transmitting a high quality data through wireless, satellite, ADSL, etc.

Figure 1:
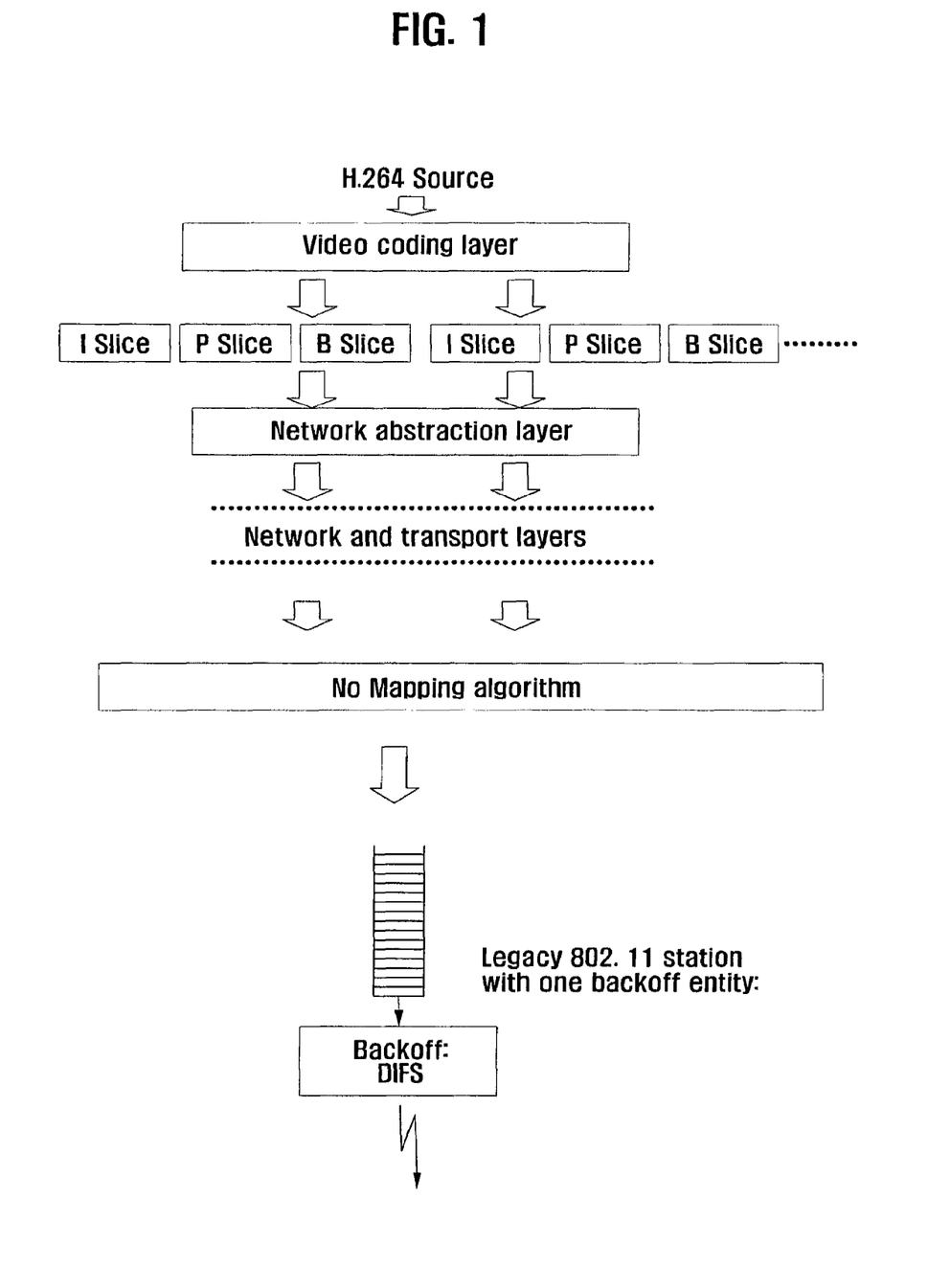
FIG. 1 is a diagram illustrating a conventional H.264 compressed video data transmission mechanism over an 802.11 standard network.

FIG. 1 is a diagram illustrating an H.264 compressed video data transmission mechanism over an 802.11 standard network.

Referring to FIG. 1, video data is H.264 coded, at a video coding layer (VCL), so as to be output in the form of slices, i.e., parameter set information slices, Intra (I) slices, IDR picture (I) slices, Predicted (P) slices, and Bi-predicted (B) slices. The slices are processed, at a Network Abstraction Layer (NAL), to adapt networks, then output in the format of Real Time Protocol data unit. The network-adapted video data are then transmitted in accordance with IEEE 802.11 MAC under the rule of a Distributed Coordination Function Inter frame space (DIFS) without applying per slice mapping algorithm.

In such video data transmission scheme, however, the H.264 coded video data transmission is performed without consideration of capabilities of recipient devices, whereby video quality is not guaranteed at the recipient device.

Figure 2:
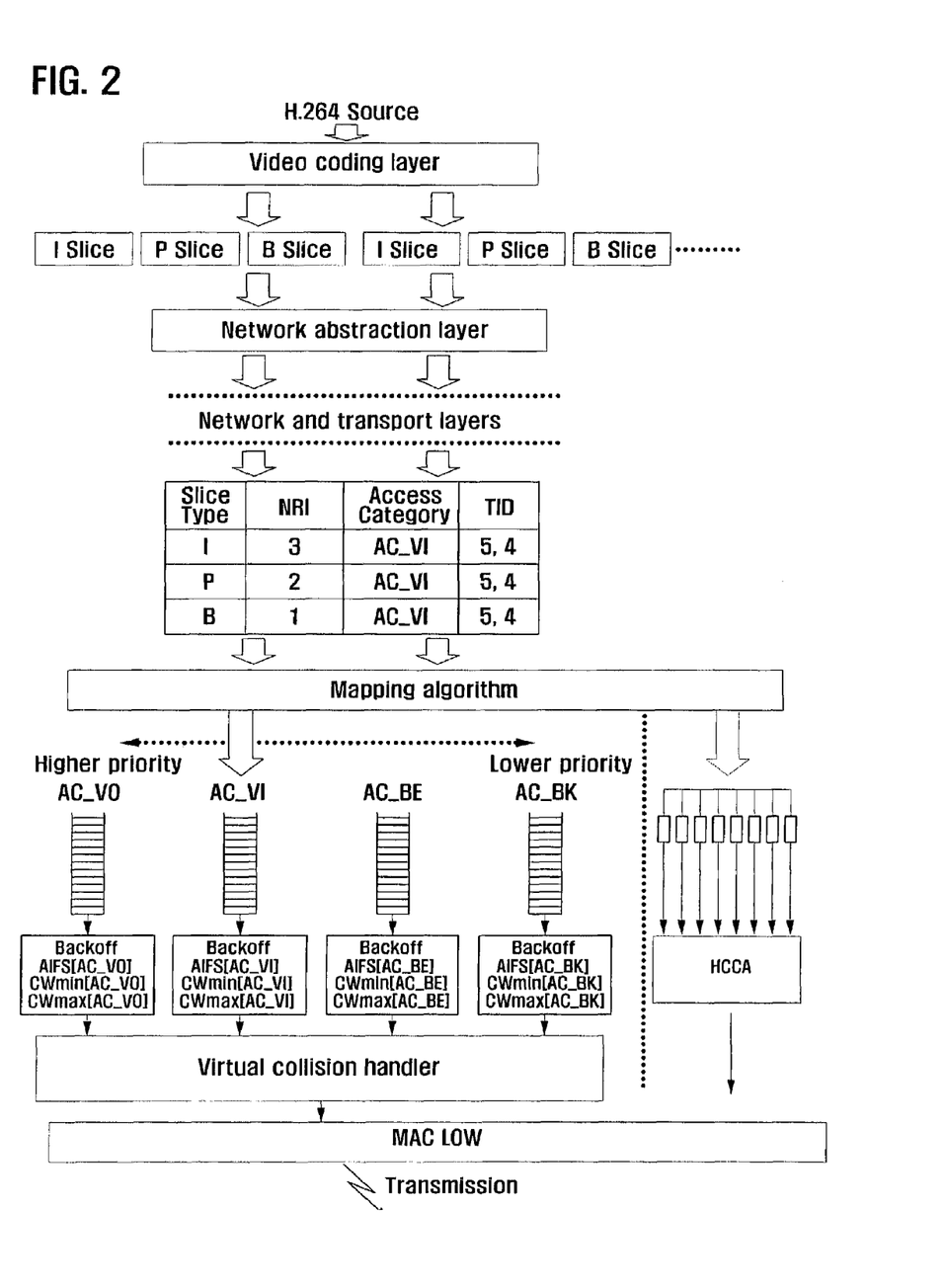
FIG. 2 is a diagram illustrating another convention H.264 compressed video data transmission scheme over an 802.11e standard network.

FIG. 2 is a diagram illustrating another convention H.264 compressed video data transmission scheme over an 802.11e standard network. In this video data transmission scheme, the H.264 coded video data are mapped to a single EDCA entity to be transmitted to IEEE 802.11e network. The H.264 coded data are formatted in association with RTP. Each packet slice passes the NAL and network and transport layers, and is assigned a NAL reference indication (nal_ref_indication; NRI). Next, the packet slice is mapped to an AC_VI as an EDCA entity (or Access Category; AC) and then transmitted under the control of MAC of IEEE 802.11e.

Unlike FIG. 1, in the video data transmission scheme of FIG. 2, each of I, P, and B slices is assigned a Traffic Identifier (TID) and a NRI. In FIG. 2, the slices are assigned AC_VI as the access category and 5, 4 as the TID. Also, the I, P, and B slices are assigned NRIs of 3, 2, and 1, respectively. The Access Category is contained in a header of the packet slice, and TID and NRI are contained in a frame header of the IEEE 802.11e MAC frame. Referring to the Access Category and TID, it is possible to determine how to transmit the packet data.

Figure 3:
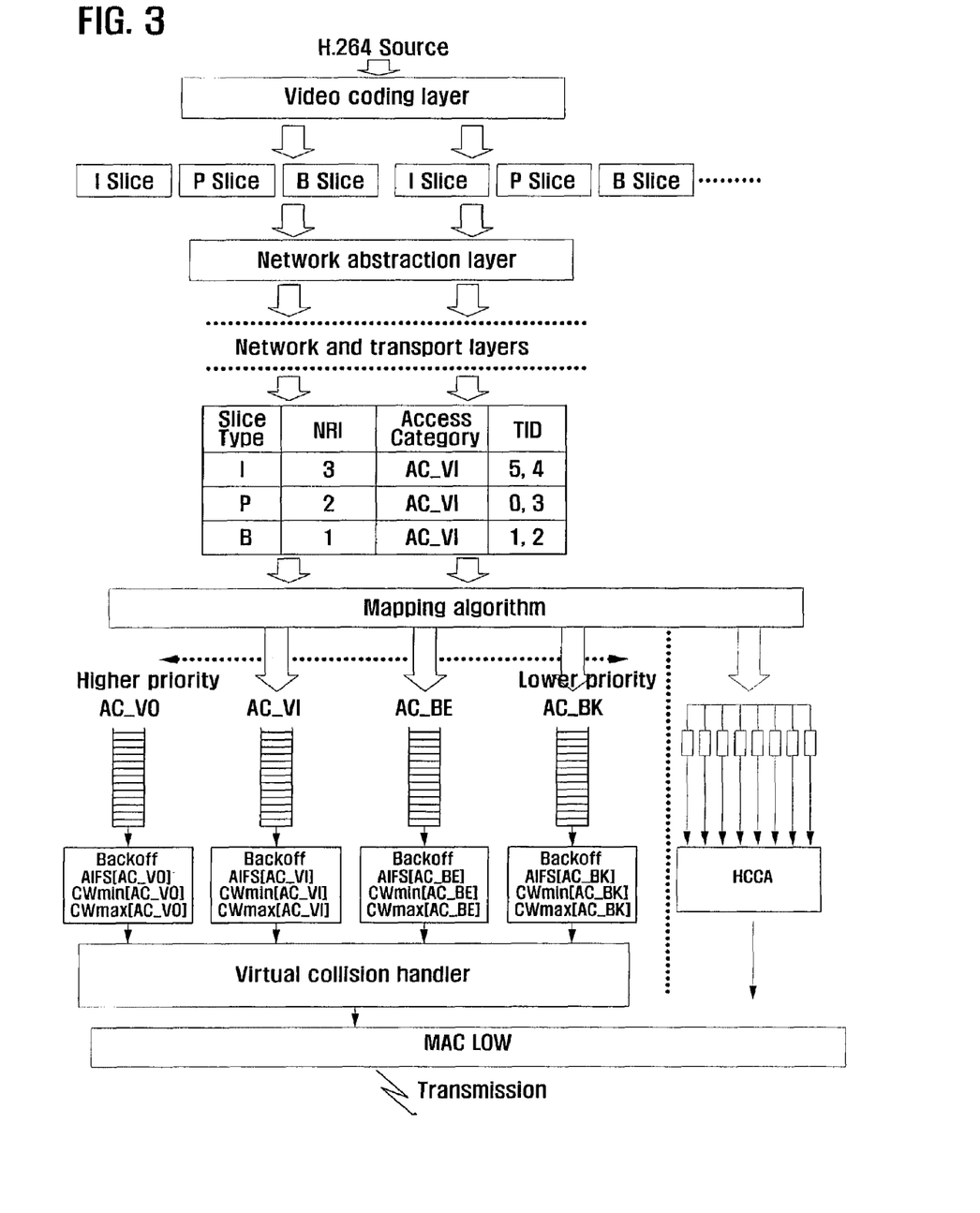
FIG. 3 is a diagram illustrating another conventional H.264 compressed video data transmission mechanism over an 802.11e standard network.

FIG. 3 is a diagram illustrating another conventional H.264 compressed video data transmission mechanism over an 802.11e standard network. In this video data transmission scheme, packet slices are mapped to different EDCA entities in consideration of priorities of the packets slices.

Referring to FIG. 3, the H.264 coded video data are treated only using the EDCA, and different EDCA entities (i.e. AC_VO, AC_VI, AC_BE, AC_BK) are used in accordance with priority of each packet slice.

The I slice is assigned the AC_VO (voice) which is the first priority CA and TID of 5, 4; P slice is assigned the AC_VI (video) which is the second priority CA and TID of 0, 3; and B slice is assigned the AC_BE (best effort) which is the third priority CA and TID of 1, 2. An I-frame has an NRI of 3, P-frame has an NRI of 2, and B-frame has an NRI of 1.

In the cases of video data transmission schemes of FIGS. 2 and 3 that use only EDCA, the EDCA provides class-based differentiated QoS to the IEEE 802.11 WLAN. However, EDCA is very sensitive to the increase in the number of stations, and EDCA throughput quickly degrades as the number of stations increases.

That is, when multiple stations are connected to an Access Point (AP), the EDCA can control the priorities of the traffic, but it does not support a minimum bandwidth guarantee and transport delay time. This is becoming a significant factor degrading the service quality in real time video conference services.

Since the IEEE 802.11e shares a physical layer of the IEEE 802.11a/b/g which controls the transmission rate on the basis of channel status between an AP and stations, the data rate varies in a range of 2 Mbps~54 Mpbs according to the movements of the stations in the service area of the AP. Such data rate variation makes difficult to guarantee a fixed bandwidth for a multimedia application service. For this reason, a data rate control mechanism for guarantee a minimum bandwidth for specific service together with the location and received signal strength based on the data rate control.

Since the change of data rate makes a significant influence to a multimedia application service quality as described above, there is a need for an improved mapping technique, between the multimedia application service layer and the network layer, that can minimize the influence of the variation of the bandwidth at the physical layer.

SUMMARY OF THE INVENTION

The present invention has been made in an effort to solve the above problems and provides additional advantages, by providing a video data transmission method and apparatus for improving the video data transmission efficiency by classifying video data in consideration of their importance in recovering at a recipient device and transmitting the classified video data using both contention free transmission mechanism and priority-based transmission mechanism.

In accordance with an aspect of the present invention, a video data transmission method includes dividing video data into different types of slices; assigning different transport priorities to slice types in accordance with importance for recovering, at a recipient device, the video data; and transmitting the slices on the basis of the transport priorities.

In accordance with another aspect of the present invention, a video data receiving method includes dividing video data into different types of slices; assigning different reception priorities to slice types in accordance with importance for recovering, at a recipient device, the video data; receiving video data slices in accordance with slice types; and combining the video data slices having different types.

In accordance with another aspect of the present invention, a video data transmission apparatus includes a video data divider for dividing video data into slices having different types; a priority assigner for assigning different transport priorities to the slice types in accordance with importance for recovering, at a recipient device, the video data; and a transmitter for transmitting the slices on the basis of the transport priorities.

In accordance with another aspect of the present invention, a video data reception apparatus includes a video data classifier for classifying video data into different types of slices; an priority assigner for assigning different reception priorities to slice types in accordance with importance for receiving the video data; and a receiver for receiving video data slices in accordance with slice types and reception priorities.

BRIEF DESCRIPTION OF THE DRAWINGS

The above features and advantages of the present invention will be more apparent from the following detailed description in conjunction with the accompanying drawings, in which.

DETAILED DESCRIPTION OF THE INVENTION

Now, embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

Under HCF controlled channel access (HCCA) mechanism, a contention free access is guaranteed by the access point (AP). In the contrast to HCCA access mechanism, the video data are processed to be transmitted depending on the type and priority of the data.

Figure 4A:
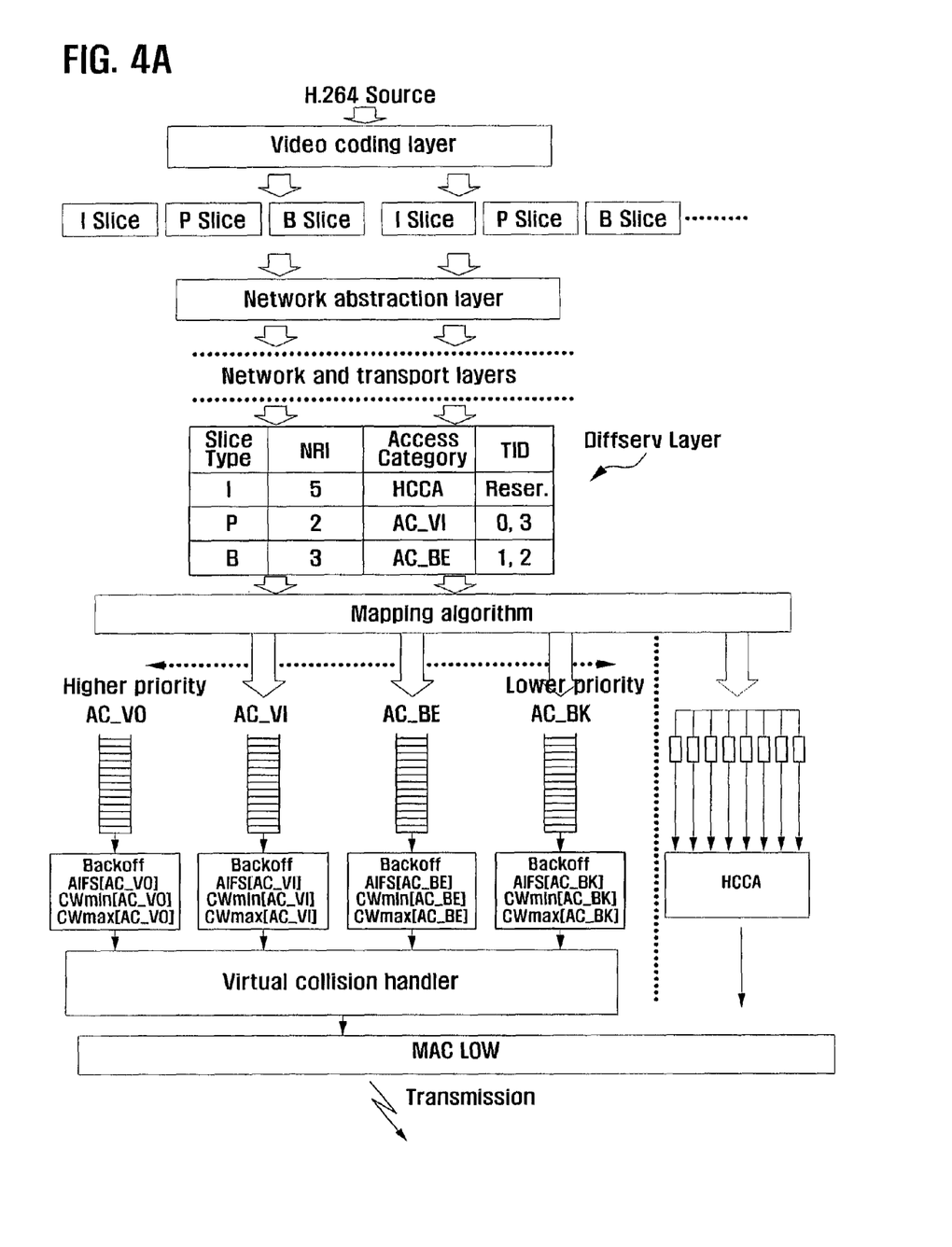
FIG. 4a is a diagram illustrating an H.264 video data transmission mechanism for an IEEE 802.11e WLAN according to an exemplary embodiment of the present invention.

FIG. 4a is a diagram illustrating an H.264 video data transmission mechanism for IEEE 802.11e WLAN according to an exemplary embodiment of the present invention. In this embodiment, the H.264 compressed video data are mapped to HCCA and enhanced distributed channel access (EDCA) entities according to different importance of the video data in MAC layer without employing data partitioning (DP).

Referring to FIG. 4a, a video coding layer (VCL) divides original video streams input from a video source to generate I, P, and B slices. The I, P, and B slices are transported to a network abstraction layer (NAL) so as to be differentiated and encapsulated into packets, each with an NAL Reference Identification (NRI) indicating the priority of the payload of the packet. The packets pass network and transport layers, then mapped to access categories (ACs), i.e. AC_VO, AC_VI, AC_BE, and AC_BK in a MAC layer.

The I, P, and B packets are corresponding to the I, P, and B slices. That is, the I packet includes entire data for a specific picture, the P packet is a packet extracted from the I packet which including a displacement of the I packet, and B packet includes the data predicted from the I or P packet. Thus, it is preferably that the I packet has a highest priority, followed by P packet and then by B packet. Accordingly, the I packet is transported through the HCCA, and the P and B packets are transported through EDCA in consideration of their transport priorities. P packet is preferably treated as AC_VI, and the B packet is preferably treated as AC_BE, in EDCA mechanism. A priority determination is described later.

Figure 4B:
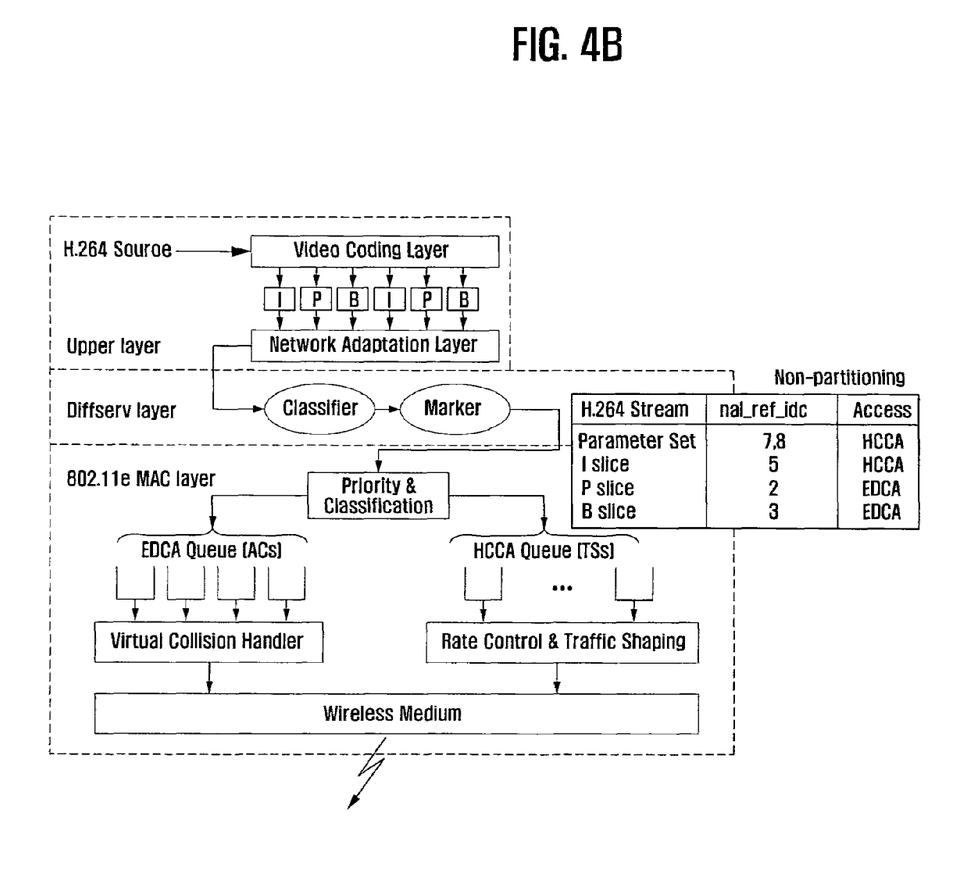
FIG. 4b is a diagram illustrating an H.264 video data transmission mechanism for an IEEE 802.11e WLAN according to another exemplary embodiment of the present invention.

FIG. 4b is a diagram illustrating an H.264 video data transmission mechanism for an IEEE 802.11e WLAN according to another exemplary embodiment of the present invention. As shown, the H.264 compressed video data are classified into data stream having different importance and mapped to HCCA and EDCA entities according to different importance of the video data in MAC layer without employing data partitioning (DP).

Referring to FIG. 4b, a video coding layer (VCL) divides original video stream input from a video source to generate Parameter Set Information (PSI), and I, P, and B slices. The PSI, I, P, and B slices are transported to a network abstraction layer (NAL) so as to be differentiated and encapsulated into packets, each with an NAL Reference Identification (NRI) indicating the priority of the payload of the packet. The packets delivered from the NAL is classified into I, P, and B packets by a classifier and then marked in association of the access category (AC) of the MAC layer. At this time, the each packet is assigned a priority (Nal_Ref_Idc) and access mechanism, such that each packet is queued in the corresponding transmission queue in association of the access category on the basis of its priority and access mechanism in the MAC layer. The packets queued in the EDCA transmission queue are transmitted through the wireless channel under the control of a virtual collision handler, and the packets queued in the HCCA transmission queue are transmitted through the wireless channel under the control of a rate control and traffic shaping entity. In such manner, the H.264 video streams are transmitted through the HCCA or EDCA mechanism.

Figure 4C:
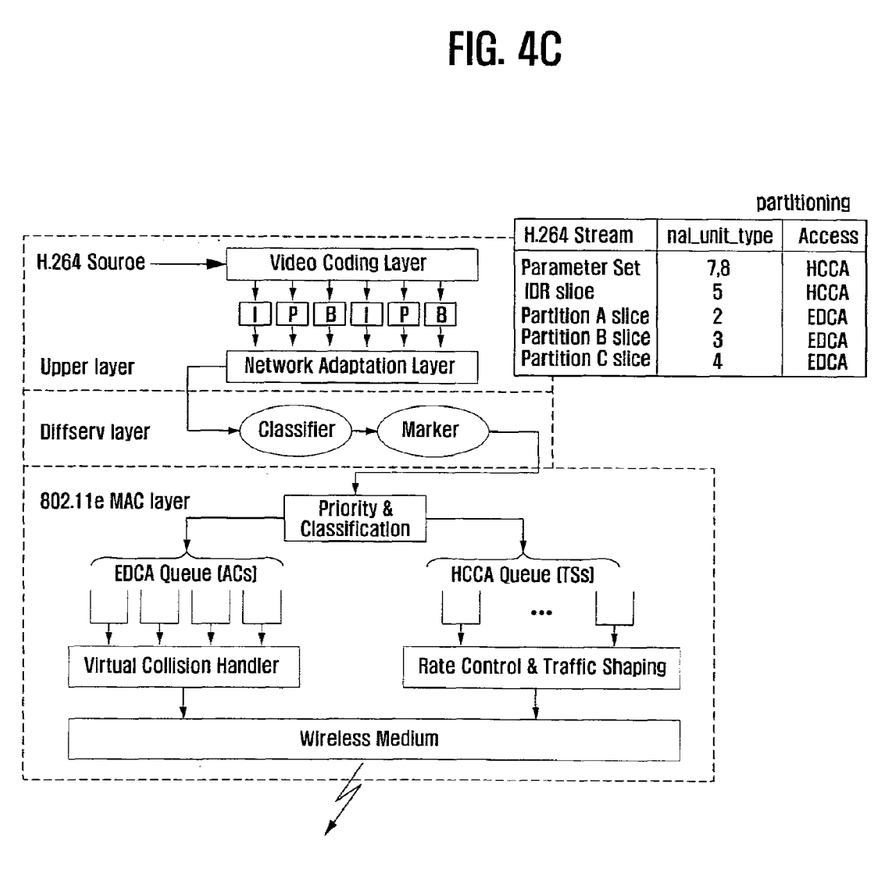
FIG. 4c is a diagram illustrating an H.264 video data transmission mechanism for IEEE 802.11e WLAN according to another exemplary embodiment of the present invention.

FIG. 4c is a diagram illustrating an H.264 video data transmission mechanism for IEEE 802.11e WLAN according to another exemplary embodiment of the present invention. As shown, the H.264 compressed video data are partitioned into separate units of different importance, and the partitions are mapped to the HCCA and EDCA entities according to different importance of the partitions.

Referring to FIG. 4c, a video coding layer (VCL) partitions and divides original video stream to generate Parameter Set Information (PSI), Instantaneous Decoding Refresh (IDR), I, P, and B slices. The PSI and IDR slices, and Partition A, Partition B, and Partition C slices are transported to a network abstraction layer (NAL) so as to be differentiated and encapsulated into packets, each with an NAL Reference Identifier (NRI) indicating the priority of the payload of the packet. The packets delivered from the NAL is classified into partition A, B, C slices by a classifier and then marked in association of the access category (AC) of the MAC layer. The Partition A, B, and C slices are transmitted in the EDCA transmission mechanism, and the PSI and IDR slices are transmitted in the HCCA transmission mechanism. The partition A, B, and C slices are queued in the corresponding EDCA queues, and the PSI and IDR slices are queued in the corresponding HCCA queues. Here, the EDCA packets are mapped to corresponding access classes, i.e. AC_VO, AC_VI, AC_BE, AC_BK on the basis of the traffic priority.

Note that in the exemplary embodiments of FIGS. 4a to 4c, the transport priority of a slice is determined depending on the influence to the video quality when the slice is lost.

As described above, the H.264 video data transmission methods according to the present invention maps the priorities of the data in the application layer to access classes of the MAC layer.

Figure 5:
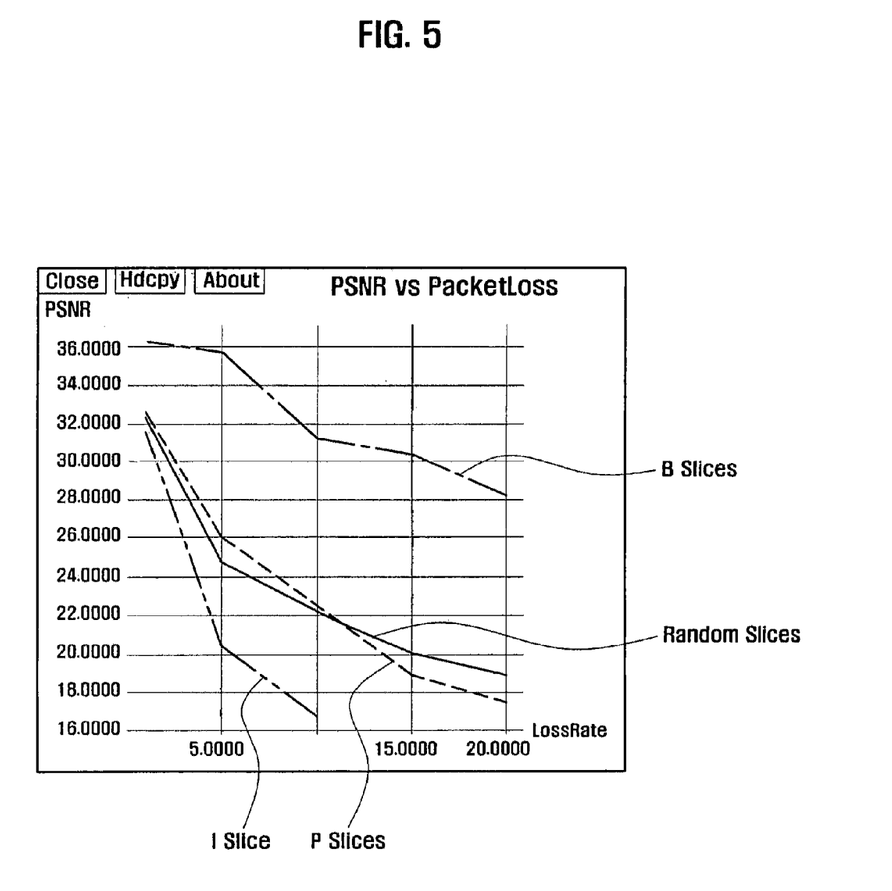
FIG. 5 is a graph illustrating variations of PSNRs to loss rates of different types of slices.

FIG. 5 is a graph illustrating variations of PSNRs to loss rates of different types of slices.

As shown in FIG. 5, 5% I slices loss of H.264 compressed video data degrades Peak Signal-to-Noise Ration (PSNR) as much as 31% from 32 dB to 20 dB (green line), 5% P slices loss degrades PSNR as much as 21% from 32 dB to 25 dB (blue line), and 5% B slices loss influenced a little to the PSNR (yellow line).

The simulation result shows that the I slice is important than other types of slices. Accordingly, in the present invention, it is preferred that the I slice should be assigned the highest transport priority for maintaining the PSNR of the received video data. Also, the simulation result shows that the P slice is more important than the B slice such that the P slice is assigned a higher transport priority than the B slice. Hence, the I slice is assigned the highest priority, followed by P slice, and then B slice. These slices are mapped to the priority access categories (ACs) provided by IEEE 802.11e EDCA.

The PSNR is the ratio between the maximum possible power of a signal and the power of corrupting noise that affects the fidelity of its representation, and is defined as 10 log([maximum signal power]/[maximum noise power]). The PSNR is compared to the SNR that is defined as 10 log [average signal power]/[average noise power]. For example, the alternate current signal of sine wave has a maximum power twice higher than the average power, and the alternate current signal of triangular wave has a maximum power triple higher than the average power. The maximum power of an alternate current signal of square wave is identical with the average power. Accordingly, the measurement of the SNR and PSNR relies on the characteristics of the signal.

The higher the PSNR value is, the more reliable the picture decoded in the recipient device is. For this reason, a codec performance test is carried out by comparing the data ratios required by the competitive codecs at the time when the encoded pictures show the same PSNR (for example, a picture quality). That is, the performance of a codec is determined by an encoded file size that can maintain the picture quality before encoding.

Figure 6A:
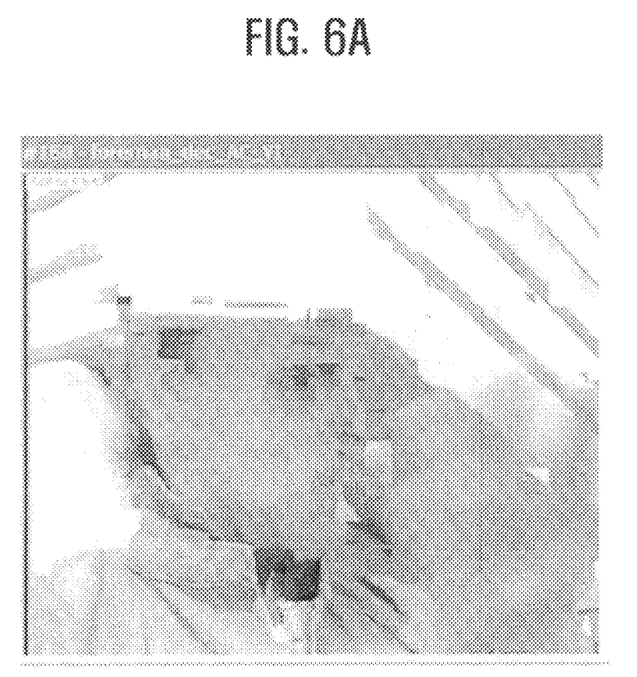
FIG. 6a shows a picture received at a recipient device when I, P, and B slices of an H.264 compressed picture are mapped to AC_VI of EDCA as in FIG. 3.

FIG. 6a shows a picture received at a recipient device when I, P, and B slices of an H.264 compressed picture are mapped to AC_VI of EDCA as in FIG. 3. As shown in FIG. 6a, the received picture is significantly distorted. In this case, the measured PSNR was 29.02 dB.

Figure 6B:
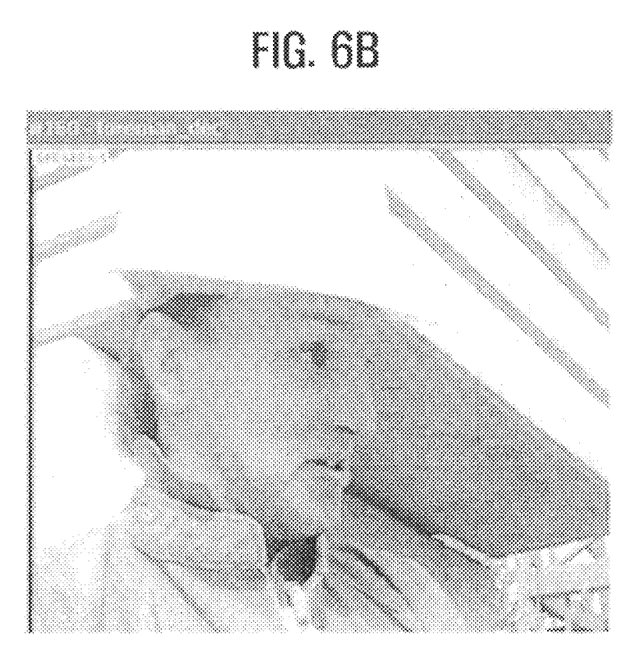
FIG. 6b shows a pictured received at a recipient device when I, P, and B slices of an H.264 compressed picture are transmitted through HCCA and EDCA mechanisms as in FIGS. 4a to 4c.

FIG. 6b shows a pictured received at a recipient device when I, P, and B slices of an H.264 compressed picture are transmitted through HCCA and EDCA mechanisms as in FIGS. 4a to 4c. As shown in FIG. 6b, the received picture shows better quality than that of FIG. 6a. In this case, the measured PSNR was 31.80 dB.

From the comparison between the pictures of FIGS. 6a and 6b, it can be seen that the received picture quality can be considerably enhanced by transmitting the slices of the H.264 compressed picture selectively using the DCCA and EDCA mechanism in consideration of the slice loss affection to the PSNR of the received picture without increasing transmission bandwidth.

Figure 7:
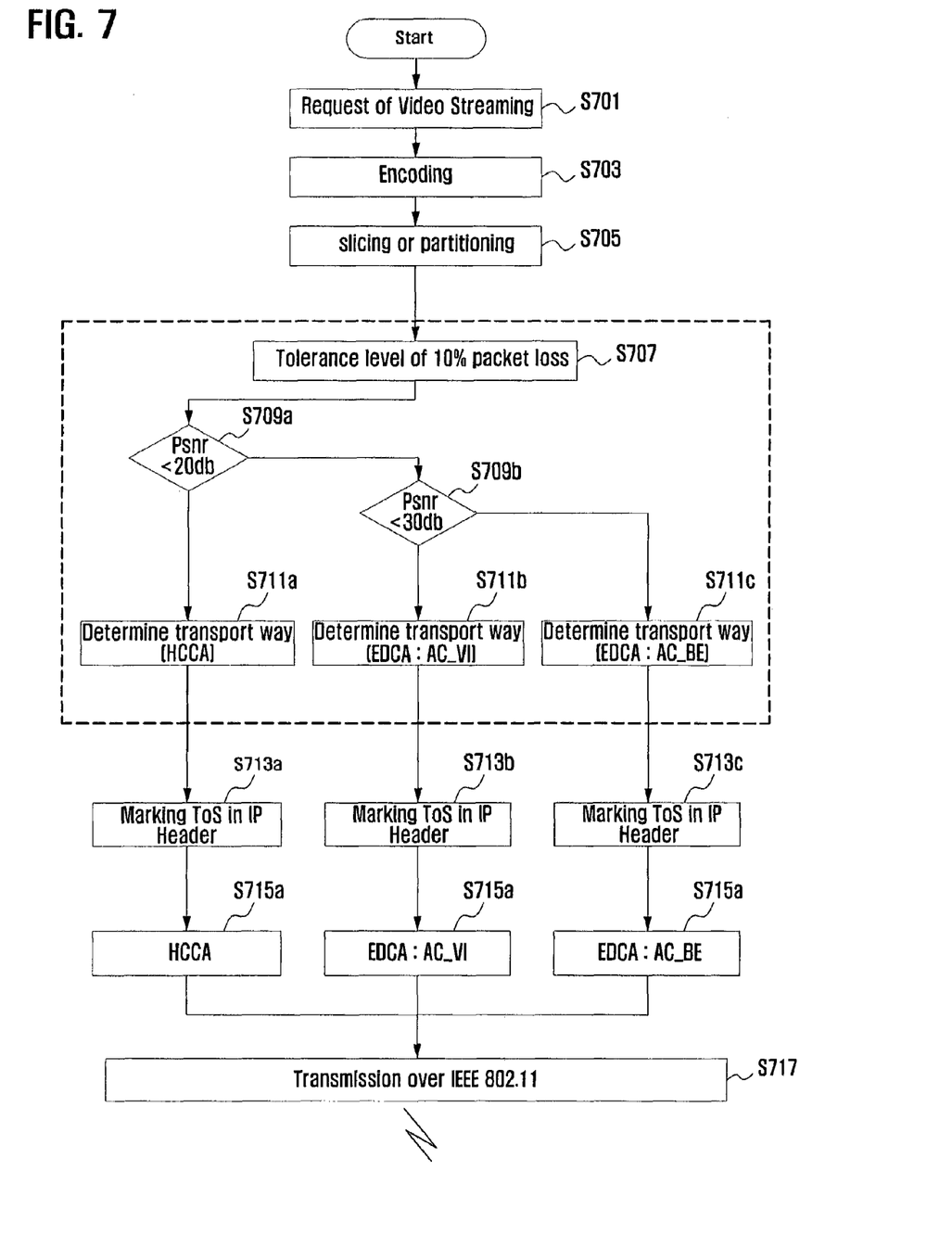
FIG. 7 is a flowchart illustrating an H.264 video data transmission method for IEEE 802.11e WLAN according to an exemplary embodiment of the present invention.

FIG. 7 is a flowchart illustrating an H.264 video data transmission method for IEEE 802.11e WLAN according to an exemplary embodiment of the present invention.

Referring to FIG. 7, if a video stream request signal is received from a recipient device associated with a communication network (S701), a transmission apparatus encodes a requested video stream (S703).

The transmission apparatus stores video files as the source of the requested video stream. The communication network can be a wired or wireless network. Preferably, the communication network is a wireless local area network (WLAN). The transmission apparatus can be a data server, a personal computer, or a laptop computer. Also, the recipient device can be a data server, a personal computer, a laptop computer, and the like.

At step S703, the transmission apparatus performs encoding on the video file requested by the recipient device. In this embodiment, the transmission apparatus encodes the video file using the H.264 codec.

The transmission apparatus partitions or divides the compressed video file in the form of compressed video stream so as to generate partitions or slices.

In a case that the data partitioning is not employed, the compressed video data is sliced into I (Intra), P (Predicted), and B (Bi-predictive) type slices.

The I type slice contains only one I macroblock. Every macroblock is predicted from the previously coded data in the same slice. The P type slice contains P macroblock and/or I macro block. The B type slice contains B macroblock and/or I macroblock.

In a case that the data partitioning is employed, the compressed video data are partitioned. Besides partition A, partition B, and partition C, parameter set information and instantaneous decoding refresh (IDR) are used.

The compressed video data are packetized and then partitioned into partition A, partition B, and partition C through the data partitioning (DP). The partitions A, B, and C contain the slice data and are useful for error resilient decoding. Particularly, the partition A contains header information on a slice header and headers of macroblocks in the slice, the partition B carries the encoded offset data for the intra slice macroblocks and Switching Intro (SI) slice macroblocks, and partition C carries the encoded offset data for the inter-coded macroblocks in a forward direction or in both the forward and reverse directions. Each partition is individually transmitted so as to be located at a separated NAL unit.

After packet slicing or partitioning the video data, the transmission apparatus determines a threshold value of the packet loss (S707). That is, how much loss in the transmitted data affects the video quality of the received picture is determined in percentage. The threshold value relies on the system performance and network environment. In this embodiment, 10% of the entire transmitted data is set for the threshold value.

Next, the transmission apparatus determines whether the 10% loss of the I, P, and B type slices or partitions A, B, and C affects the PSNR of the received video data (S709a and S709b).

In FIG. 5, the PSNR decreased from 32 dB to 17 dB when the I frame loss is 10%, from 32 dB to 22 dB when the P frame loss is 10%, and from 36 dB to 31 dB when the B frame loss is 10%.

According to the determination result at steps S709a and S709b, the transmission scheme is determined (S711a, S711b, S711c).

For example, since the PSNR of the received video data is decreased below 20 dB by the 10% data loss of the P frame, the I slice is designated to be transmitted through contention free transmission mechanism (in this embodiment, HCCA).

Also, since the PSNR of the received video data is decreased so as to be in the range between 20 dB and 30 dB by the 10% data loss of the P slice, the P slice is designated to be transmitted through a priority-based transmission mechanism (in this embodiment, AC_VI of EDCA mechanism).

Further, since the PSNR of the received video data is over 30 dB by the 10% data loss of the B slice, the B slice is designated to be transmitted through a priority-based transmission (in this embodiment, AC_BE of the EDCA mechanism).

After the slices are mapped to the respective transmission schemes, the TID is assigned to each slice for identifying the payload of the packets (S713a, S713b, and S713c).

Referring to FIG. 4a, the I slice is transmitted through the HCCA mechanism and is assigned a TID value of "reservation". The P slice is transmitted through the EDCA mechanism with an access category of AC_VI and is assigned a TID value of '0, 3'. The B slice is transmitted through the EDCA mechanism with an access category of AC_BE and is assigned a TID value of '1, 2'.

After the transmission schemes and TIDs are assigned to the slices, the transmission apparatus determines the final frame formats on the basis of the transmission schemes and TIDs of the slices (S715a, 715b, and 715c). The access categories and TID values for the slice types are listed in the form of a table in FIG. 4a.

Next, the transmission apparatus starts transmission of the slices in accordance with the respective transmission schemes over the IEEE 802.11e network (S717).

In accordance with the video data transmission method according to the present invention, the video data compressed in an encoder (for example, H.264 encoder) are classified in different importance; the classified video data are mapped to the access classes provided by the IEEE 802.11e MAC and transmitted in accordance with transmission scheme and access priority.

Figure 8:
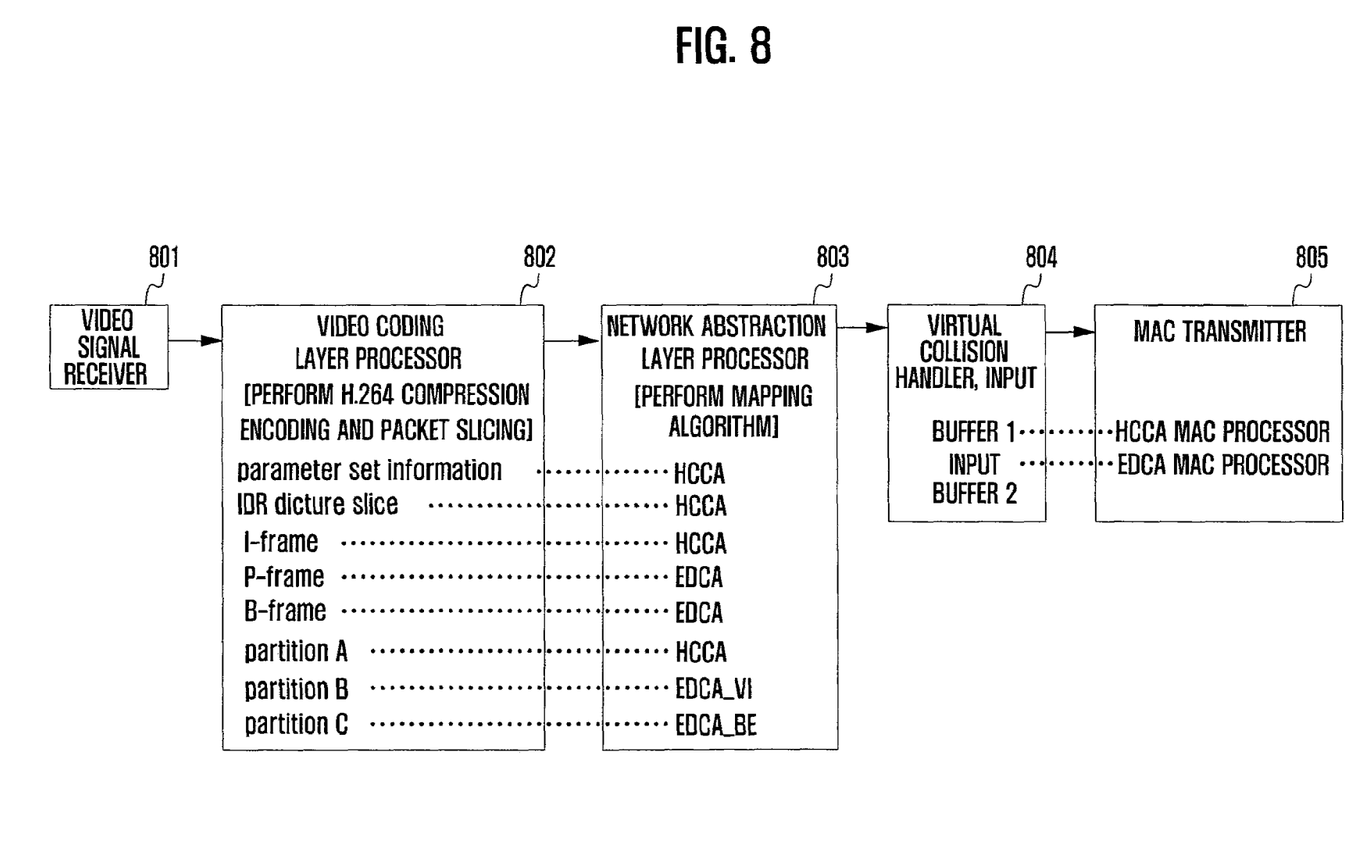
FIG. 8 is a block diagram illustrating a configuration of a video data transmission apparatus according to an exemplary embodiment of the present invention.

FIG. 8 is a block diagram illustrating the configuration of a video data transmission apparatus according to an exemplary embodiment of the present invention.

Referring to FIG. 8, the video data transmission apparatus includes a video signal receiver 801, a video coding layer processor 802, a network abstraction layer processor 803, a virtual collision handler 804, and a MAC transmitter 805.

The video signal receiver 801 receives video signal input from a video source (not shown). The video signal receiver 801 packetizes the video signal and outputs the packetized video data to the video coding layer processor 802.

The video coding layer processor 802 slices the packets that is received from the video signal receiver 801 into a plurality of slices and classifies the slices by their types. The video coding layer processor 802 performs H.264 coding and packet slicing.

The video coding layer processor 802 can generate different types of slices depending on whether a data partitioning is enabled or not. That is, in the case that the data partitioning is not enabled, the video coding layer processor 802 slices the video data into I slice, P slice, and B slice. In the case that the data partitioning is enabled, however, the video coding layer processor 802 generates a parameter set information slice and/or IDR picture slice in addition to the I, P, and B slices. The generated slices are directed to the network abstraction layer processor 803 with an associated header.

The network abstraction layer processor 803 maps the parameter set information slices, IDR picture slices, and I slices to an HCCA entity. The network abstraction layer processor 803 also maps the P slices and B slices to EDCA_VI and EDCA_BE entities, respectively. Accordingly, the slices are transmitted in different transmission mechanisms according to their types.

The transmission entities have different transmission priorities. The transmission priority is determined on the basis of the PSNR degradation extent affected by the slice loss, such that the slice type much affecting the PSNR degradation is assigned a higher transmission priority.

The virtual collision handler 804 includes a plurality of input buffers corresponding to the transmission entities such that the slices are queued in the respective input buffers.

The virtual collision handler 804 delivers the slices to the MAC transmitter 805 under the rule of a Distributed Coordination Function Inter Frame Space (DIFS) of an IEEE 802.11e MAC protocol.

The MAC transmitter 805 transmits the video data of the slice type having the highest transmission priority using a first transmission scheme and transmits the video data of the slice type having the lower transmission priority using a second transmission scheme.

The MAC transmitter includes a HCCA MAC processor, EDCA MAC processor, and a selector.

The HCCA MAC processor transmits the video data queued in a first buffer of the virtual collision handler 804 and the EDCA MAC processor transmits the video data queued in a second buffer of the virtual collision handler 804.

The selector checks the transmission priority of the video data such that the video data processed by the HCCA MAC processor are transmitted with higher priority.

The MAC transmitter 805 operates with the IEEE 802.11e MAC protocol for communication with the IEEE 802.11e AP.

Although exemplary embodiments of the present invention are described in detail hereinabove, it should be clearly understood that many variations and/or modifications of the basic inventive concepts herein taught which may appear to those skilled in the present art will still fall within the spirit and scope of the present invention, as defined in the appended claims.

As described above, the video data transmission method and device of the present invention classifies the video data into different data types in accordance with importance affecting a video quality at a recipient device and transmits the video having the higher importance with higher priority, thereby improving transmission efficiency of network, particularly, WLAN and securing a high quality picture at the recipient device.

What is claimed is:

1. A video data transmission method comprising:
   dividing video data into different types of slices;
   assigning different transport priorities to slice types in accordance with importance for recovering the video data at a recipient device;
   mapping the slice types to different transmission mechanisms, including a first, contention-free transmission mechanism, and a second transmission mechanism in which slices are transmitted on the basis of transport priorities; and
   transmitting highest priority slices via the first transmission mechanism, and lower priority slices via the second transmission mechanism.

2. The video data transmission method of claim 1, wherein the first transmission mechanism is a hybrid coordination function controlled channel access (HCCA), and the second transmission mechanism is an enhanced distributed channel access (EDCA).

3. The video data transmission method of claim 1, wherein the video data are compressed in accordance with a predetermined encoding scheme, and the compressed video data are packetized in accordance with a transport protocol.

4. The video data transmission method of claim 3, wherein the encoding scheme is a multimedia compression encoding scheme.

5. The video data transmission method of claim 4, wherein the multimedia compression encoding scheme is an H.264 advance video coding (AVC).

6. The video data transmission method of claim 1, wherein the slice types are determined by data partitioning which partitions compressed video data.

7. The video data transmission method of claim 6, wherein the slice types comprise a parameter set information (PSI) type, an instantaneous decoding refresh (IDR) type, a partition A type, a partition B type, and a partition C type.

8. The video data transmission method of claim 1, wherein the slice types are determined without data partitioning.

9. The video data transmission method of claim 8, wherein the slice types comprise an Intra (I) type, a predicted (P) type, and a bi-predictive (B) type.

10. The video data transmission method of claim 1, wherein the transport priority is determined on the basis of video quality degradation extent, at a recipient device, affected by corresponding slice type data loss.

11. The video data transmission method of claim 10, wherein the video quality degradation extent is measured by a peak signal-to-noise ratio (PSNR) of each slice type.

12. The video data transmission method of claim 1, wherein the transport priority of each slice type is determined by comparing the PSNR to threshold values of 20 dB and 30 dB.

13. The video data transmission method of claim 12, wherein the slice type of which PSNR is less than 20 dB is assigned a first transport priority; the slice type of which PSNR is greater than 20 dB and less than 30 dB is assigned a second transport priority; and the slice type of which PSNR is greater than 30 dB is assigned third priority.

14. The video data transmission method of claim 1, wherein the video data comprises digital video data.

15. A video data receiving method for receiving video data divided into different types of slices, the method comprising:
    assigning different reception priorities to slice types in accordance with importance for recovering the video data at a recipient device;
    mapping the slice types to different reception mechanisms, including a first, contention-free reception mechanism, and a second reception mechanism in which slices are received on the basis of reception priorities;
    receiving, in accordance with slice types, highest priority video data slices via the first reception mechanism, and lower priority slices via the second reception mechanism; and
    combining the received video data slices.

16. The video data receiving method of claim 15, wherein the first reception mechanism is a hybrid coordination function controlled channel access (HCCA), and the second reception mechanism is an enhanced distributed channel access (EDCA).

17. A video data transmission apparatus comprising:
    a video data divider dividing video data into slices having different types;
    a priority assigner assigning different transport priorities to the slice types in accordance with importance for recovering, at a recipient device, the video data;
    a mapper mapping the slice types to different transmission mechanisms, including a first, contention-free transmission mechanism, and a second transmission mechanism in which slices are transmitted on the basis of transport priorities; and
    a transmitter transmitting highest priority slices via the first transmission mechanism, and lower priority slices via the second transmission mechanism.

18. The video data transmission apparatus of claim 17, wherein the first transmission mechanism is a hybrid coordination function controlled channel access (HCCA), and the second transmission mechanism is an enhanced distributed channel access (EDCA).

19. The video data transmission apparatus of claim 17 being one of a network facility, a data server, a personal computer, and a laptop computer.

20. The video data transmission apparatus of claim 19, wherein the network facility is an access point (AP).

21. The video data transmission apparatus of claim 17 being connected to a communication network.

22. The video data transmission apparatus of claim 21, wherein the communication network is a wireless local area network.

23. A video data reception apparatus comprising:
    a video data classifier classifying video data into different types of slices;

a priority assigner assigning different reception priorities to slice types in accordance with importance for receiving the video data;

a mapper mapping the slice types to different reception mechanisms, including a first, contention-free reception mechanism, and a second reception mechanism in which slices are received on the basis of reception priorities; and a receiver receiving, in accordance with slice types and reception priorities, highest priority video data slices via the first reception mechanism, and lower priority slices via the second reception mechanism.

24. The video data reception apparatus of claim 23, wherein the first reception mechanism is a hybrid coordination function controlled channel access (HCCA), and the second reception mechanism is an enhanced distributed channel access (EDCA).

25. The video data reception apparatus of claim 23 being one of a network facility, a data server, a personal computer, and a laptop computer.

26. The video data reception apparatus of claim 25, wherein the network facility is an access point (AP).

27. The video data reception apparatus of claim 23 being connected to a communication network.

28. The video data reception apparatus of claim 27, wherein the communication network is a wireless local area network.

* * * * *